United States Patent Office 2,778,819
Patented Jan. 22, 1957

2,778,819

1-ALKOXY-3 IMINO-ISOINDOLENINE DERIVATIVES

Fritz Baumann, Leverkusen-Bayerwerk, and Berthold Bienert and Georg Rösch, Leverkusen-Wiesdorf, Germany, assignors to Farbenfabriken Bayer Aktiengesellschaft, Leverkusen, Germany, a corporation of Germany No Drawing. Original application August 21, 1950, Serial No. 180,695, now Patent No. 2,683,643, dated July 13, 1954. Divided and this application July 2, 1952, Serial No. 296,944

Claims priority, application Great Britain August 25, 1949

10 Claims. (Cl. 260—319)

This application is a divisional application of our co-pending application Serial No. 180,695, now Patent No. 2,683,643.

The present invention relates to the manufacture of isoindolenine compounds, more specifically to 1-alkoxy-3-imino-isoindolenines of the general formula

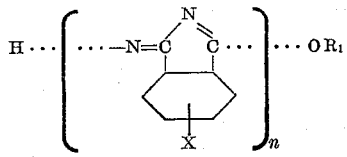

wherein X stands for substituents which do not prevent the formation of phthalocyanines, $R_1$ for a lower alkyl radical and $n$ for the integer 1.

3-imino-indolenines carrying an —$OR_1$-group in 1-position and wherein $n=1$ (cf. the above general formula) may be produced, for instance, by treating o-arylene dinitriles or their nuclear substitution products capable of forming phthalocyanines in alcohols or in mixtures of alcohols with other solvents with preferably equimolar quantities of alkali metal alcoholates or substances acting as alkali metal alcoholates and isolating the crystalline products precipitating during reaction or after cooling by conventional methods.

The new compounds are derivatives of the isoindolenine:

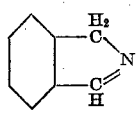

wherein the hydrogen standing in 1-position is substituted by an alkoxy group and the hydrogen standing in 3-position by an imino group. Therefore the compounds are believed to have the constitution of 1-alkoxy-3-imino-isoindolenine:

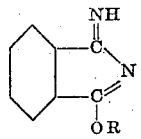

They may further contain 1 mol of alcohol in addition to the double bond of the heterocyclic ring as an addition.

Suitable starting materials for the production of 1-alkoxy-3-imino-isoindolenines according to the present invention are phthalonitrile and, furthermore, 1.2.4.5-tetracyanobenzene, o-cyanobenzimino ether, alkyl substituted phthalonitrile, for instance, 4-methyl-phthalonitrile and 4-tertiary-butyl-phthalonitrile, 3.4-dicyano-diphenyl as well as phthalonitrile substituted by alkoxy-, phenoxy-, sulfonic acid groups and halogen. As polynuclear dinitriles may be mentioned naphthalene-2.3-dinitrile and as heterocyclic dinitrile dicyano-pyridine-2.3. Also diphenyl maleic acid dinitrile which in this case is to be regarded as an aromatic system, may be used as starting material for this reaction. Furthermore, o-dinitriles may find application which are substituted in the nucleus by one or more $CH_3S$—, $C_2H_5S$—, $C_6H_5S$—, aryloxy and arylthio radicals. It is to be understood that all dinitriles or functional derivatives of o-dicarboxylic acids being free from carbonyl groups which are known as starting materials in the production of phthalocyanines may aso be used for producing the new intermediates according to the present invention.

Suitable alkali metal alcoholates are, for instance, those of sodium, potassium, lithium whereby the alcohol component may consist of monovalent alcohols, such as methyl, ethyl, isopropyl, butyl alcohol or also of higher alcohols. The same effect is attained when using the alcoholates of polyvalent alcohols, for instance, of glycol, or of glycerol. Of course, the alkali metal alcoholates may be replaced by substances acting as the said alcoholates. A solution of sodium amide in a monovalent low alcohol may be mentioned as example. Also solutions of alkali hydroxides in alcohols may be used for accomplishing the present reaction. It is not absolutely necessary to charge ready-made alcoholates but also the alkali metal may be introduced into the alcoholic solution of the o-arylene dinitrile.

The monomeric alkoxy-imino-isoindolenines formed during reaction show the tendency as is set forth below to condense with each other while alcohol is split off. Condensation can be prevented by taking care that sufficient quantities of activated alkoxy groups are present. Hence it follows that the amount of the above-said alcoholates or other substances which may be used instead of such alcoholates required for carrying out the reaction, must not be too small. Generally not less than one mol of the alcoholate or substances acting as alcoholates calculated on the o-arylene dinitrile charged is to be used. Sometimes it may be of advantage to use more than 1 mol of the alcoholate. However, in some cases good results are also obtained with smaller quantities of the alcoholate.

The reaction may be carried out in the presence of a further solvent. Suitable solvents are, for instance, benzene, toluene or also aliphatic hydrocarbons, chloroform, dioxane, liquid ammonia. In this case, it is of particular advantage to process with the above-said larger quantities of alcoholates. Liquid ammonia to be used in combination with the alkali metal alcoholates has proved to be a particularly valuable solvent for accomplishing the present invention. Liquid ammonia displays the advantage that the reaction is achieved therein at a very high speed and very pure reaction products which can easily be isolated are obtained in a good yield. Irrespective of which of the solvents or solvent mixtures are used, care has to be taken that processing is performed as far as possible in the absence of water since water exhibits a saponification effect upon the alkoxy-imino-isoindolenines which probably results in the formation of the corresponding compounds substituted in 1-position by a hydroxy group which represent in their tautomeric form the imino-arylene-dicarboxylic acid-imides. Imino-arylene-dicarboxylic acid-imide is not capable of reacting with the alcoholates to form the alkoxy compounds. Therefore, the performance of this reaction in the presence of water represents a process of producing mono-imino-arylene-dicarboxylic acid-imides from o-arylene-dinitriles in a good yield.

The o-arylene-dinitriles react with the alcoholates while heat is set free. Therefore, after completion of the reaction the mixture is preferably cooled to low temperatures, for instance, to —20° C, since the condensation of the monomeric products is promoted at higher temperatures. The monomeric metal-free compounds precipitate on cooling from the solution in form of colorless to weakly yellow colored crystals which contain no alkali metal. They are strongly basic and represent relatively stable compounds. They may be cautiously recrystallized from alcohols. They are easily soluble in aqueous solutions of organic acids and may be precipitated again from these solutions in crystalline form by means of weak alkalies if the reaction is carried out in the cold and the acid is not allowed to act for a longer time. On longer standing in acid aqueous solutions, especially in dilute mineral acids or on heating, the compounds are saponified with the formation of the corresponding mono-imino-arylene-dicarboxylic acid-imides or of arylene-dicarboxylic acid-imides. Alkali salts being easily soluble in alcohol are obtained from these compounds in concentrated alcoholic solutions of alkali metal alcoholates. On diluting the solutions with alcohols or water the alkali salts are very readily liable to alcoholysis and hydrolysis with the reformation of the starting material. Furthermore, as already mentioned above, these salts show the tendency to condense while splitting off alcohol—which may be received on determining the melting point—whereby at last a green-yellow melt remains behind. By rapidly heating the decomposition temperatures are at about 130° C. The action of light may also lead to slow decomposition.

The new monomeric intermediate products are extraordinarily reactive substances wherein the alkoxy group as well as the imino group are very mobile. Thus, for instance, the alkoxy group may be replaced by an amino group without difficulty as is described in Patent No. 2,727,043.

The primarily formed monomeric mono-alkoxy compounds—provided that compunds of lower monovalent alcohols are concerned—generally add a further molecule of alcohol and are obtained after isolation as dialkoxy compounds. The second alkoxy group probably stands either in 1-position with the formation of acetals or also in 3-position. The hydrogen of alcohol enters into the adjacent nitrogen atom.

The new products according to the present invention are valuable intermediate products in the organic-chemical synthesis.

Furthermore, they are valuable intermediate products for the production of phthalocyanines on the fiber as it is described in our co-pending application Serial No. 180,695, now Patent No. 2,683,643. The reactive monomeric alkoxy-imino-isoindolenines are suitable for producing 3-imino-isoindolenines substituted in 1-position, i. e. for producing 1-amino derivatives as it is described in co-pending application Serial No. 180,696, now Patent No. 2,727,043.

The invention is further illustrated by the following examples without being restricted thereto, the parts being by weight.

*Example 1*

50 parts of very finely powdered phthalonitrile are introduced with stirring into a solution of 10 parts of sodium in 237 parts of methanol at room temperature. The temperature gradually rises to 35–40° C. and falls again. The starting product gradually dissolves with weakly yellow coloration and the addition compound separates in crystals before the product has completely been dissolved. After 3 hours' stirring at room temperature the solution is cooled to −10° C., sucked off, and the precipitated methoxy-imino-isoindolenine is washed with a small amount of cold 50% methanol until the yellowish mother solution is removed from the almost colorless crystals. The product is dried at room temperature in vacuo over calcium chloride.

The yield amounts to 47.5 parts of methoxy-imino-isoindolenine having one molecule of $CH_3OH$ as an addition. The product consists of brilliant, almost colorless small prisms which decompose at 132–134° C. with the generation of gas and the formation of a yellow green melt.

*Example 2*

12.5 parts of sodium are dissolved in 789 parts of absolutely anhydrous ethyl alcohol. After cooling to +20° C. 128 parts of very finely powdered phthalonitrile are introduced into the solution. The temperature rises to 25° C. within 20 to 30 minutes and is kept at 25° C. by moderately cooling.

The phthalonitrile dissolves gradually and the reaction product precipitates from the weakly yellow solution in small, colorless crystals.

If evolution of heat no longer is perceptible—after about 1 to 2 hours—the solution is cooled to −10° C. for completing crystallization, sucked off and the crystals are washed with ice-cold 50% alcohol until the washings are colorless. Thereupon the crystals are washed with water and dried in vacuo at 30° C. until constancy of weight is attained. 180 parts of 1-ethoxy-3-imino-isoindolenine having a further mol of $C_2H_5OH$ as an addition are obtained in form of a colorless, sandy crystal flour. The yield corresponds to 87% of theory. The product is soluble in cold 5% acetic acid and melts at 138–142° C. while splitting off alcohol and with the formation of a green melt.

*Example 3*

2.3 parts of sodium are dissolved in excess ethyl alcohol and the solution is reduced in vacuo to 18 to 23 parts. The ethylate paste thus obtained is stirred with 52–64 parts of liquid ammonia in a transparent Dewar container.

12.8 parts of phthalonitrile in very finely distributed form are rapidly added to the solution with stirring at about −30° C. Almost complete dissolution rapidly takes place while $NH_3$ is extracted by vigorously boiling. Then a colorless reaction product crystallizes with further boiling. The reaction mixture is stirred for another 10 minutes, slowly treated with 100 parts of ice water, sucked off and the crystals are thoroughly washed with water. After drying in vacuo at 30–40° C. until constancy of weight is attained 16 parts of a practically colorless substance which is identical with the product described in Example 2 are obtained. The yield amounts to 92% of theory.

*Example 4*

The procedure of Example 3 is followed, however, ethanol is replaced by methanol. The dinitrile dissolves readily. Methoxy-imino-isoindolenine is precipitated by diluting with saturated common salt solution. After removing ammonia the product proves to be stable in water and may be dried in vacuo. The yield amounts to 13.4 parts of methoxy-imino-isoindolenine corresponding to 76% of theory. By adding ammonium nitrate solution to the filtrate some difficultly soluble nitrate of amino-imino-isoindolenine may be precipitated in crystalline form.

*Example 5*

On following the procedure of Example 2, however, replacing 2.5 parts of sodium by 4 parts of potassium, approximately the same yield of metal-free ethoxy-imino-isoindolenine is obtained.

*Example 6*

A solution of 4.3 parts of sodium amide in 79 parts of methanol is reacted with 12.8 parts of phthalonitrile at 20° C. up to maximum 26° C.

After stirring for 3 hours, cooling to −10° C., sucking off, washing and drying, besides condensed isoindolenine derivatives remaining in the yellow alkaline solution, about 9.5 to 10 parts of monomeric methoxy-imino-isoindolenine corresponding to 60% of theory.

Example 7

On following the procedure of Example 2, however, charging instead of 12.5 parts of sodium the double amount, i. e. 25 parts of sodium, the temperature raises more rapidly. The same isoindolenine derivative as described in Example 2 is obtained in equally good yield.

Reducing the amount of sodium to 6 parts, the yield of ethoxy-imino-isoindolenine is reduced to about 113 parts whereas a larger quantity of condensed ethoxy-imino-isoindolenines is contained in the more intensely yellow colored solution.

Example 8

2.5 parts of sodium are dissolved in isopropyl alcohol and the solution obtained is concentrated to about 18 parts by distilling off the excess isopropyl alcohol. The isopropylate paste is made up in a Dewar container with liquid ammonia to about 70 parts, thereupon 12.8 parts of very finely powdered phthalonitrile are added in portions with stirring. The reaction is complete within a few minutes.

The reaction mixture is gradually diluted with ice and water so as to form 370 parts, rapidly sucked off and the precipitate is washed with water. The crude product is almost colorless, however, becomes weakly yellowish at room temperature in the vacuo exsiccator after some hours. The yield amounts to 15.8 parts of 1-isopropyloxy-3-imino-isoindolenine.

From ligroin boiling at 90–95° C., the 1-isopropyloxy-3-imino-isoindolenine crystallizes in large, brilliant, almost colorless to slightly yellowish prisms melting at 95–96° C.

The process may be modified by dissolving first the sodium in aqueous ammonia, adding 1 mol of alcohol or more to this solution drop by drop—the deep blue solution brightening thereby with the formation of alcoholate—and then introducing the nitrile.

In analogous manner react n-propylalcohol, n- and isobutanol, hexylalcohol and cyclohexanol.

Example 9

12.8 parts of phthalonitrile are dissolved in 55.5 parts of hot glycol and the solution is cooled to 60° C. whereby part of the dinitrile precipitates again. Then, a solution heated to 60° C. consisting of 1.2 parts of sodium in 55.5 parts of glycol is added with stirring.

The dinitrile dissolves within about 5 minutes with weakly greenish yellow coloration. On subsequently cooling the reaction product crystallizes in colorless small prisms. It is sucked off at about 0° C., washed with water and dried first in vacuo at low temperature, then, for a short time, at temperatures up to 95° C.

The colorless product which is believed to be 1-β-hydroxy-ethoxy-3-imino-isoindolenine is obtained in a quantity of 11.2 parts and melts in its crude state at 167° C., after recrystallization from methanol at 170° C. with yellow green coloration. The product is soluble in cold 5% acetic acid and is readily converted into copper phthalocyanine with copper salts at water-bath temperatures.

In the same manner also other glycols, such as propylene glycol, 1.3- and 1.4-butylene glycol as well as higher-valent alcohols and their ethers having at least one free hydroxy group may be reacted with o-dinitriles to form the corresponding imino-isoindolenines.

Example 10

12.8 parts of powdered phthalonitrile are introduced with stirring at room temperature into a solution of 1.2 parts of sodium in 102 parts of monoethanol amine. The temperature rises to about 30° C. and falls again within one hour. The dinitrile has clearly dissolved during that time. On reacting the clear, almost colorless solution with 105 parts of 10% hydrochloric acid—taking care that the temperature does not exceed 50° C. which is achieved by outside cooling—the condensation product deposits as a colorless, crystalline precipitate. It is cooled to 0° C., sucked off and washed with water.

After drying at 95° C. about 19.5 parts of a colorless reaction product free from chlorine melting at 199° C. is obtained. On recrystallization from methanol whereby colorless little needles are obtained the melting point rises only by 1° C. to 199–200° C.

According to elementary analysis the product is a compound having 2 molecules of ethanol amine attached to 1 molecule of phthalonitrile with the reduced content of 1 molecule of NH₃. The product yields copper phthalocyanine on heating with copper acetate in formamide. No dyestuff formation is effected in glycol.

We claim:

1. The process for the production of monomeric 1-alkoxy-3-imino-isoindolenine derivatives which essentially comprises treating at temperatures from —30° to +60° an o-arylene dinitrile in the presence of a lower aliphatic alcohol with substantially equimolar quantities of a compound selected from the group consisting of alkali metal alcoholates, alkaline earth metal alcoholates, alkali metal hydroxides and alkali metal amides and recovering the resulting 1-alkoxy 3-imino isoindolenine derivative.

2. The process for the production of 1-alkoxy-3-imino-isoindolenine derivatives which comprises treating at temperatures from —30° to +60° an o-arylene dinitrile in the presence of liquid ammonia and a lower aliphatic alcohol with at most equimolar quantities of a compound selected from the group consisting of alkali metal alcoholates, alkaline earth metal alcoholates, alkali metal hydroxides and alkali metal amides and recovering the resulting 1-alkoxy-3-imino isoindolenine derivative.

3. The process for the production of monomeric 1-alkoxy-3-imino-isoindolenine derivatives which essentially comprises treating at temperatures from —30° to +20° an o-arylene dinitrile in the presence of a lower aliphatic alcohol substantially equimolar quantity of a compound selected from the group consisting of alkali metal alcoholates, alkaline earth metal alcoholates, alkali metal hydroxides and alkali metal amides and recovering the resulting 1-alkoxy-3-imino isoindolenine derivatives.

4. The process for the production of 1-isopropoxy-3-imino-isoindolenine of the formula

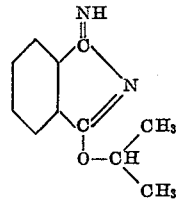

which comprises treating at temperatures from —30 to +60° C. phthalonitrile in the presence of isopropyl alcohol and of liquid ammonia with at most equimolar quantities of a compound selected from the group consisting of alkali metal alcoholates, alkaline earth metal alcoholates, alkali metal hydroxides and alkali metal amides and recovering the 1-isopropyl-3-imino-isoindolenine formed.

5. The process for the production of 1-alkoxy-3-imino-isoindolenine derivatives which essentially comprises treating at temperatures from —30 to +60° C. an o-arylene dinitrile in the presence of a lower aliphatic alcohol with substantially equimolar quantities of a compound selected from the group consisting of alkali metal alcoholates, alkaline earth metal alcoholates, alkali metal hydroxides and alkali metal amides and recovering the resulting 1 - alkoxy - 3 - imino - isoindolenine derivatives formed.

6. As new compounds

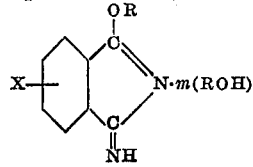

wherein R stands for an alkyl radical, having a carbon chain of not more than 6 carbon atoms, X stands for a substituent selected from the group consisting of hydrogen, phenyl, lower alkyl, lower alkoxy, phenoxy and halogen, and $m$ stands for 0 and 1.

7. As a new compound

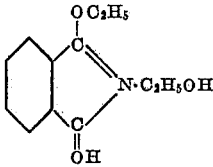

8. As a new compound

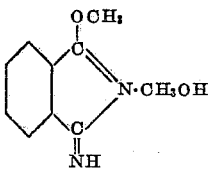

9. The process for the production of 1-ethoxy-3-imino-isoindolenine of the formula

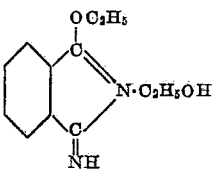

which comprises treating at temperatures from —30° C. to +20° C. phthalonitrile in the presence of ethanol with ¼ to at most the equimolecular quantity of a compound selected from the group consisting of alkali metal alcoholates, alkaline earth, metal alcoholates, alkali metal hydroxides and alkali metal amides.

10. The process for the production of 1-methoxy-3-imino-isoindolenine of the formula

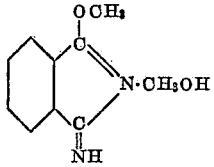

which comprises treating at temperatures from —30° C. to +20° C. phthalonitrile in the presence of methanol with ¼ to at most the equimolecular quantity of a compound selected from the group consisting of alkali metal alcoholates, alkaline earth metal alcoholates, alkali metal hydroxides and alkali metal amides.

References Cited in the file of this patent

UNITED STATES PATENTS

| | | |
|---|---|---|
| 2,025,791 | Thorpe et al. | Dec. 31, 1935 |
| 2,182,763 | Muehlbauer | Dec. 5, 1939 |
| 2,683,643 | Baumann et al. | July 13, 1954 |

OTHER REFERENCES

Jour. Soc. Dyers and Colourists, March 1945, pp. 68–73.

Linstead: J. Chem. Soc. (London), 1934, pp. 1022–27.